United States Patent
Fujisaki

(10) Patent No.: US 11,936,243 B2
(45) Date of Patent: Mar. 19, 2024

(54) ROTATING ELECTRIC MACHINE

(71) Applicant: DENSO CORPORATION, Kariya (JP)

(72) Inventor: Katsuya Fujisaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 557 days.

(21) Appl. No.: 17/137,158

(22) Filed: Dec. 29, 2020

(65) Prior Publication Data

US 2021/0119503 A1 Apr. 22, 2021

Related U.S. Application Data

(63) Continuation of application No. PCT/JP2019/028405, filed on Jul. 19, 2019.

(30) Foreign Application Priority Data

Jul. 26, 2018 (JP) ................................. 2018-140392

(51) Int. Cl.
| | |
|---|---|
| *H02K 1/27* | (2022.01) |
| *H02K 1/276* | (2022.01) |
| *H02K 21/14* | (2006.01) |
| *H02K 29/03* | (2006.01) |

(52) U.S. Cl.
CPC ............ *H02K 1/276* (2013.01); *H02K 21/14* (2013.01); *H02K 29/03* (2013.01); *H02K 2213/03* (2013.01)

(58) Field of Classification Search
CPC .......... H02K 1/16; H02K 1/276; H02K 21/14; H02K 2201/06; H02K 2213/03; H02K 29/03; H02K 3/28
See application file for complete search history.

(56) References Cited

U.S. PATENT DOCUMENTS

| | | | |
|---|---|---|---|
| 6,940,205 B1 | 9/2005 | Murakami et al. | |
| 8,766,468 B1 * | 7/2014 | Rilla | ........................ B60L 50/61 |
| | | | 310/156.53 |
| 2005/0179334 A1 | 8/2005 | Yoshinaga | |

(Continued)

FOREIGN PATENT DOCUMENTS

| | | |
|---|---|---|
| CN | 1476146 A | 2/2004 |
| JP | 2006-345692 A | 12/2006 |

(Continued)

OTHER PUBLICATIONS

JP-2012075278-A, Kume, all pages (Year: 2012).*
JP-2014239633-A, Okubo, all pages (Year: 2014).*

*Primary Examiner* — Naishadh N Desai
(74) *Attorney, Agent, or Firm* — MASCHOFF BRENNAN

(57) ABSTRACT

A three-phase winding is energized so that a phase difference θe1 between each set is 30±60×n [deg] in an electrical angle. A tip portion of the teeth has a skew structure having a plurality of skew forming parts divided in an axial direction so as to be displaced by a predetermined angle θe2 in a circumferential direction in the electrical angle. A relational expression θe1>θe2 is satisfied. When a radial distance between the teeth and a circumscribed circle of a rotor core is set to a, and a radial distance between an outermost part of a permanent magnet located on the outermost side in a radial direction in a permanent magnet and the circumscribed circle is set to b, a relational expression a/b<1 is satisfied.

10 Claims, 9 Drawing Sheets

(56) References Cited

U.S. PATENT DOCUMENTS

| | | | |
|---|---|---|---|
| 2005/0225194 A1 | 10/2005 | Murakami et al. | |
| 2007/0205687 A1 | 9/2007 | Murakami et al. | |
| 2007/0205688 A1 | 9/2007 | Murakami et al. | |
| 2010/0289372 A1 | 11/2010 | Taniguchi et al. | |
| 2012/0019089 A1 | 1/2012 | Takemoto et al. | |
| 2014/0062375 A1* | 3/2014 | Suzuki | H02P 21/22 318/496 |
| 2015/0162790 A1* | 6/2015 | Isoda | H02K 1/2766 310/156.47 |
| 2018/0233973 A1* | 8/2018 | Hazeyama | H02K 1/27 |
| 2019/0148999 A1 | 5/2019 | Ishikawa | |

FOREIGN PATENT DOCUMENTS

| | | | |
|---|---|---|---|
| JP | 2010-115054 A | | 5/2010 |
| JP | 2012-075278 A | | 4/2012 |
| JP | 2012075278 A | * | 4/2012 |
| JP | 2012-227989 A | | 11/2012 |
| JP | 2014-239633 A | | 12/2014 |
| JP | 2014239633 A | * | 12/2014 |
| JP | 2017-108565 A | | 6/2017 |

* cited by examiner

US 11,936,243 B2

ROTATING ELECTRIC MACHINE

CROSS REFERENCE TO RELATED APPLICATIONS

This application is a continuation application of International Patent Application No. PCT/JP2019/028405 filed on Jul. 19, 2019, which designated the U.S. and based on and claims the benefits of priority of Japanese Patent Application No. 2018-140392 filed on Jul. 26, 2018. The entire disclosure of all of the above applications is incorporated herein by reference.

TECHNICAL FIELD

The present disclosure relates to a rotating electric machine.

BACKGROUND

An embedded magnet type rotating electric machine has permanent magnets embedded in an outer peripheral portion of a rotor core, and a large amount of harmonics are included in a magnetic flux in an air gap between a stator and a rotor.

SUMMARY

The present disclosure is to provide a rotating electric machine capable of reducing torque ripple.

The rotating electric machine of the present disclosure includes a stator and a rotor. The stator has a stator core having a plurality of teeth extending in a radial direction, and a plurality of sets of multi-phase windings provided between the plurality of teeth. The rotor has a rotor core provided to face the teeth and a plurality of permanent magnets provided to be embedded in the rotor core.

The present disclosure has first to third aspects. Here, n is an integer. In the first and third aspects of the present disclosure, the plurality of sets of multi-phase windings are energized so that a phase difference $\theta e1$ between the sets is $30 \pm 60 \times n$ [deg] in an electrical angle. Further, in the second and third aspects of the present disclosure, a tip portion of the teeth has a skew structure having a plurality of skew forming portions divided in an axial direction so as to be displaced by a predetermined angle $\theta e2$ in the electrical angle in a circumferential direction. In the third aspect of the present disclosure, $\alpha e1$ is larger than $\theta e2$ ($\theta e1 > \theta e2$).

In the first to third aspects of the present disclosure, a radial distance between the teeth and a circumscribed circle of the rotor core is set to a, and a radial distance between an outermost part of a permanent magnet located on the outermost side in the radial direction in the permanent magnets and the circumscribed circle is set to b. A relational expression $a/b < 1$ is satisfied.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
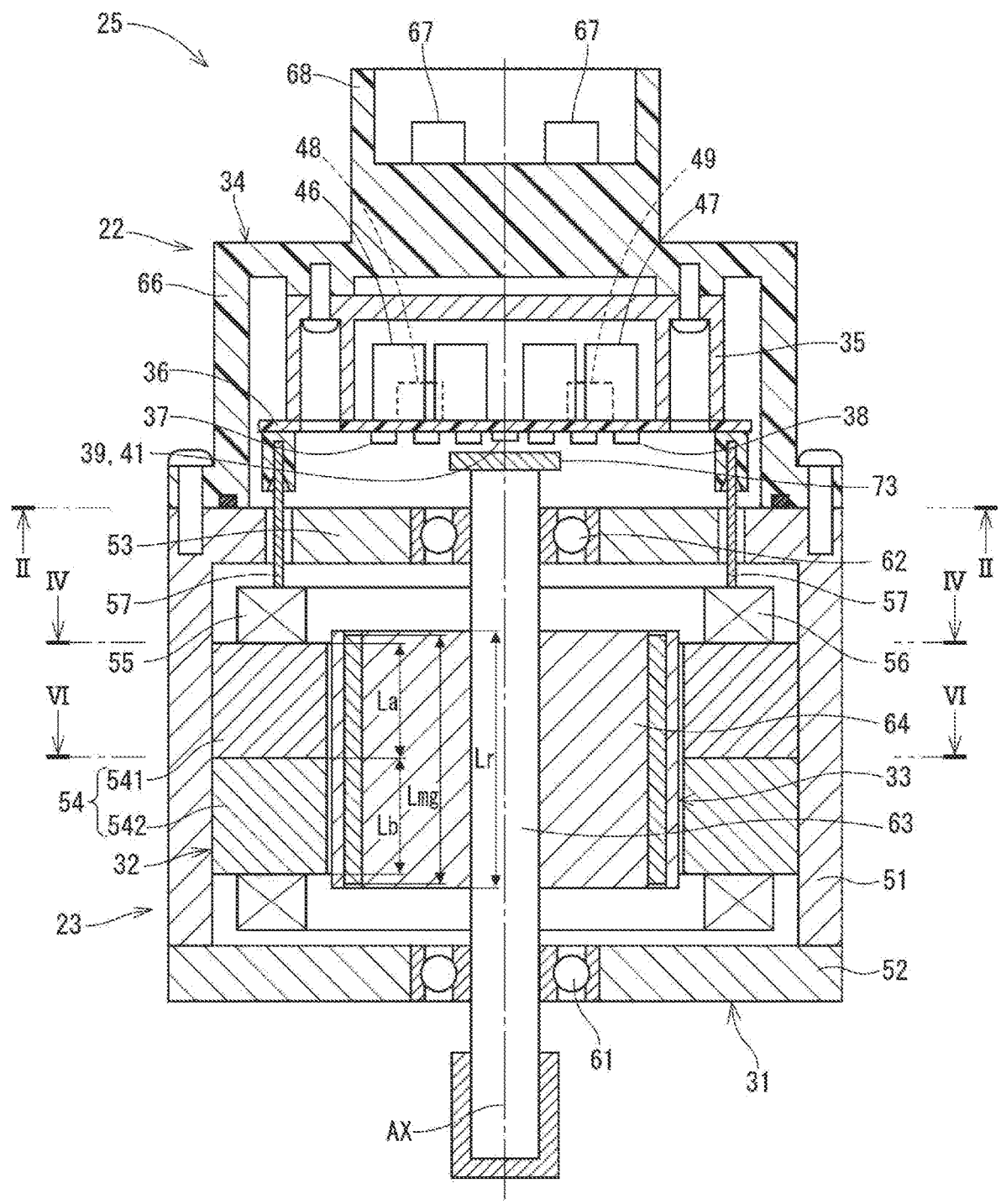
FIG. 1 is a cross sectional view of a drive device to which a motor according to one embodiment is applied.

In an assumable example, an embedded magnet type rotating electric machine has permanent magnets embedded in an outer peripheral portion of a rotor core, and a large amount of harmonics are included in a magnetic flux in an air gap between a stator and a rotor. As a result, since a distortion waveform of an induced voltage also contains many harmonics, the embedded magnet type rotating electric machine has a characteristics that the torque ripple is larger than that of the surface magnet type rotating electric machine.

To reduce torque ripple, in a rotating electric machine in which a multi-phase alternating current is flowed through a plurality of sets of multi-phase windings of a stator, the multi-phase windings between each set are energized with a phase difference. By setting the phase difference between the two sets of three-phase windings to 30° in an electrical angle, the 6th harmonic component of the torque ripple is reduced.

Further, by superimposing an appropriately adjusted 5th harmonic current on a fundamental wave current flowing through the three-phase winding, the current peak is reduced while reducing the torque ripple.

In the embedded magnet type rotating electric machine, distortion is likely to occur in the induced voltage of the rotating electric machine itself. In addition, a harmonic current may be intentionally superimposed on the fundamental current in order to suppress heat generation as in peak reduction control. All of these may cause torque ripple.

The 6th harmonic component of the torque ripple can be reduced, but the 12th harmonic component cannot be reduced. Therefore, there is room for improvement.

It is also effective for surface magnet type rotating electric machine. That is, it is not always effective in a rotating electric machine having a reluctance torque such as an embedded magnet type rotating electric machine. Also, a control frequency must be high enough to properly control the harmonic current. This is because when the rotating electric machine is operating at high speed, high-speed calculation is required according to the high speed.

The present disclosure has been made in view of the above points, and is to provide a rotating electric machine capable of reducing torque ripple.

The rotating electric machine of the present disclosure includes a stator and a rotor. The stator has a stator core having a plurality of teeth extending in a radial direction, and a plurality of sets of multi-phase windings provided between the plurality of teeth. The rotor has a rotor core provided to face the teeth and a plurality of permanent magnets provided to be embedded in the rotor core.

The present disclosure has first to third aspects. Here, n is an integer. In the first and third aspects of the present disclosure, the plurality of sets of multi-phase windings are energized so that a phase difference θe1 between the sets is 30±60×n [deg] in the electrical angle. Further, in the second and third aspects of the present disclosure, a tip portion of the teeth has a skew structure having a plurality of skew forming portions divided in an axial direction so as to be displaced by a predetermined angle θe2 in the electrical angle in the circumferential direction. In the third aspect of the present disclosure, θe1 is larger than θe2 (θe1>θe2).

In the first to third aspects of the present disclosure, a radial distance between the teeth and a circumscribed circle of the rotor core is set to a, and a radial distance between a magnet outermost part located on the outermost side in the radial direction in the permanent magnets and the circumscribed circle is set to b. A relational expression a/b<1 is satisfied.

By satisfying the relational expression a/b<1 in this way, the q-axis component of the magnetic flux of the rotor becomes small. In addition, the induced voltage distortion generated by the rotor is reduced. As a result, an influence of the reluctance torque becomes small even when there is 6th harmonic current, so that the generation of the 12th harmonic component of the torque ripple can be suppressed. Further, the structure of the rotating electric machine makes it possible to reduce the 12th harmonic component, and it does not depend on the control device.

One Embodiment

Hereinafter, one embodiment will be described based on the drawings. A motor as a "rotating electric machine" according to the present embodiment is applied to a drive device of an electric power steering system of a vehicle.

(Drive Device)

Figure 2:
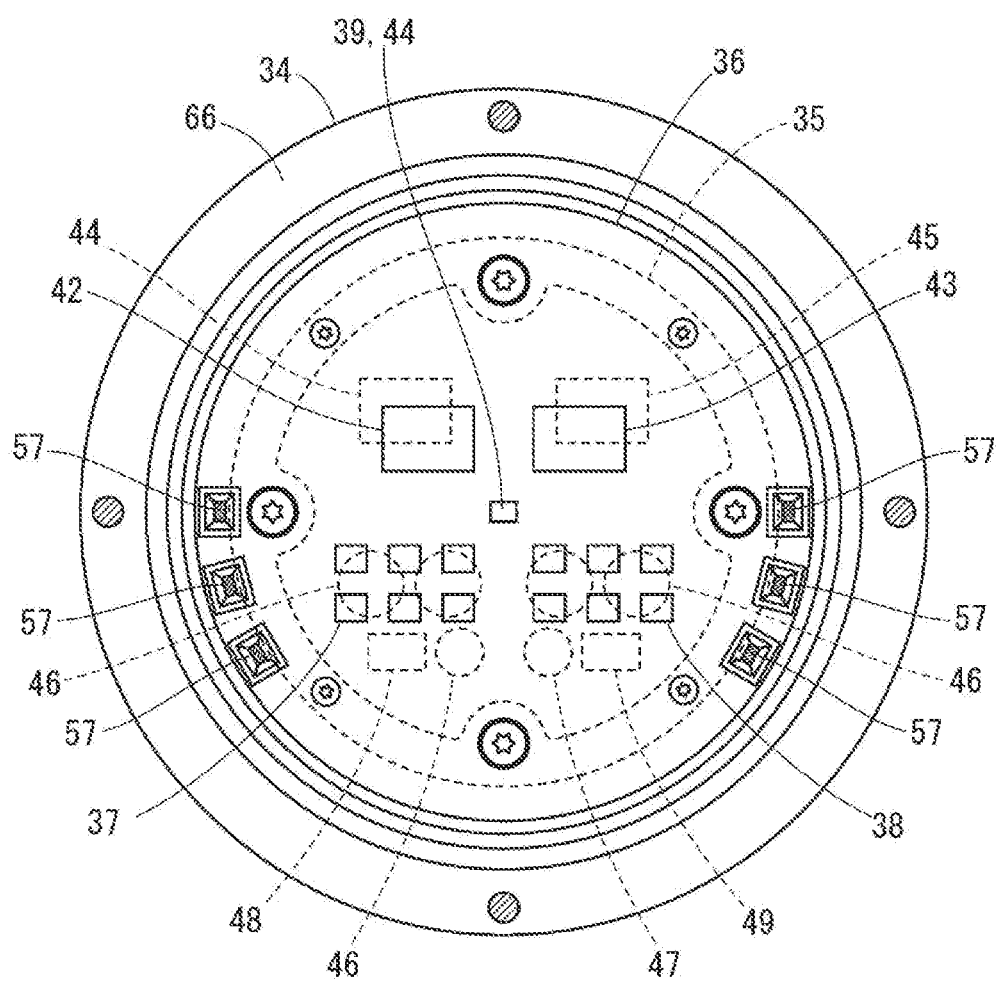
FIG. 2 is a cross sectional view taken along a line II-II of FIG. 1.

First, the drive device 25 will be described. As shown in FIGS. 1 and 2, the drive device 25 includes a motor 23 and an ECU 22. The motor 23 has a housing 31, a stator 32, and a rotor 33, and the ECU 22 has a cover 34, a heat sink 35, a substrate 36, and various electronic components 37 to 49.

The housing 31 has a tubular case 51, a front frame end 52 located at one end of the tubular case 51, and a rear frame end 53 located at the other end of the tubular case 51.

The stator 32 has a stator core 54 fixed to the housing 31 and two sets of three-phase windings 55 and 56 assembled to the stator core 54. Each of the phase windings constituting the three-phase windings 55 and 56 is connected to the substrate 36 via a lead wire 57.

The rotor 33 includes a motor shaft 63 rotatably supported by the housing 31 via bearings 61 and 62, a rotor core 64 fitted and fixed to the motor shaft 63, and a plurality of permanent magnets 65 provided to be embedded in the rotor core 64. The rotor 33 is an embedded magnet type.

The cover 34 has a cup-shaped cover main body 66 fixed to the rear frame end 53, and a connector 68 covering a terminal 67 for connecting the ECU 22 to the outside.

A heat sink 35 is fixed to the inside of the cover main body 66. The substrate 36 is fixed to the heat sink 35 at a position facing the rear frame end 53. A plurality of switching elements 37, 38, rotation angle sensors 39, 41, custom ICs 42, 43, computers 44, 45, capacitors 46, 47, inductors 48, 49, and the like are mounted on the substrate 36. The heat sink 35 may be fixed to the rear frame end 53. Further, the rear frame end 53 may also serve as a heat sink.

The switching elements 37 and 38 constitute drive circuits 71 and 72 (see FIG. 3) corresponding to the three-phase windings 55 and 56, respectively. The rotation angle sensors 39 and 41 are arranged so as to face a magnet 73 provided at a tip of the motor shaft 63. The custom ICs 42 and 43 output drive signals to the switching elements 37 and 38. The computers 44 and 45 calculate command values related to the power supplied to the three-phase windings 55 and 56 based on the rotation angle of the rotor 33 and the like. The capacitors 46 and 47 smoothen an input power supplied from power supply batteries and prevent noise generated and flowing out due to the switching operation or the like of the switching elements 37 and 38, respectively. The inductors 48 and 49 together with the capacitors 46 and 47 form a filter circuit.

The drive device 25 configured in this way rotates the rotor 33 by energizing the three-phase windings 55 and 56 based on the detected values of the rotation angle sensors 39 and 41 and generating a rotating magnetic field. The drive device 25 is a mechanical/electrical integrated type in which the ECU 22 and the motor 23 are integrally provided, but may be a separate mechanical/electrical type in which the ECU and the motor are connected by a harness.

(Motor)

Next, the motor 23 will be described in more detail. In an embedded magnet type rotating electric machine such as the motor 23, a large amount of harmonics are included in the magnetic flux in the air gap between the stator 32 and the rotor 33. As a result, many harmonics are included in the induced voltage distortion waveform. In addition, a harmonic current may be intentionally superimposed on the fundamental current in order to suppress heat generation as in peak reduction control. All of these cause torque ripple.

A torque $T_i$ of each system of the three-phase winding of the motor 23 is represented by a following equation (1). In the equation (1), $\varphi_a$ is an interlinkage magnetic flux, $i_d$ is a d-axis current, $i_q$ is a q-axis current, $L_d$ is a d-axis inductance, and $L_q$ is a q-axis inductance.

$$T_i = \varphi_a i_q + (L_d - L_q) i_d i_q \tag{1}$$

The currents $i_d$ and $i_q$ are represented by the following equations (2) and (3) when there is a 6mth harmonic current. Here, m is an integer.

$$i_d = \Sigma_{m=0} i_{6md} = \Sigma_{m=0} I_{6md} \sin(6m\theta) \tag{2}$$

$$i_q = \Sigma_{m=0} i_{6mq} = \Sigma_{m=0} I_{6mq} \sin(6m\theta) \tag{3}$$

The equations (2) and (3) are applied to the equation (1), and the 18th harmonic component and subsequent harmonic components having a small influence are omitted. Then, focusing on the 12th harmonic component, the following equation (4) is derived.

$$T_i = \varphi_a(i_{0q} + i_{6q} + i_{12q}) + 2(L_d - L_q)(i_{0d}i_{0q} + i_{0d}i_{6q} + i_{0d}i_{12q} + i_{6d}i_{0q} + i_{6d}i_{6q} + i_{12d}i_{0q}) \tag{4}$$

In the torque T represented by the sum of the torque T1 of the first system and the torque T2 of the second system, in order to reduce the torque ripple, it is required to reduce the 6th harmonic component and the 12th harmonic component of the equation (4). Hereinafter, the configuration for reducing the 6th harmonic component and the 12th harmonic component will be described.

(Phase Difference Energization)

Figure 3:
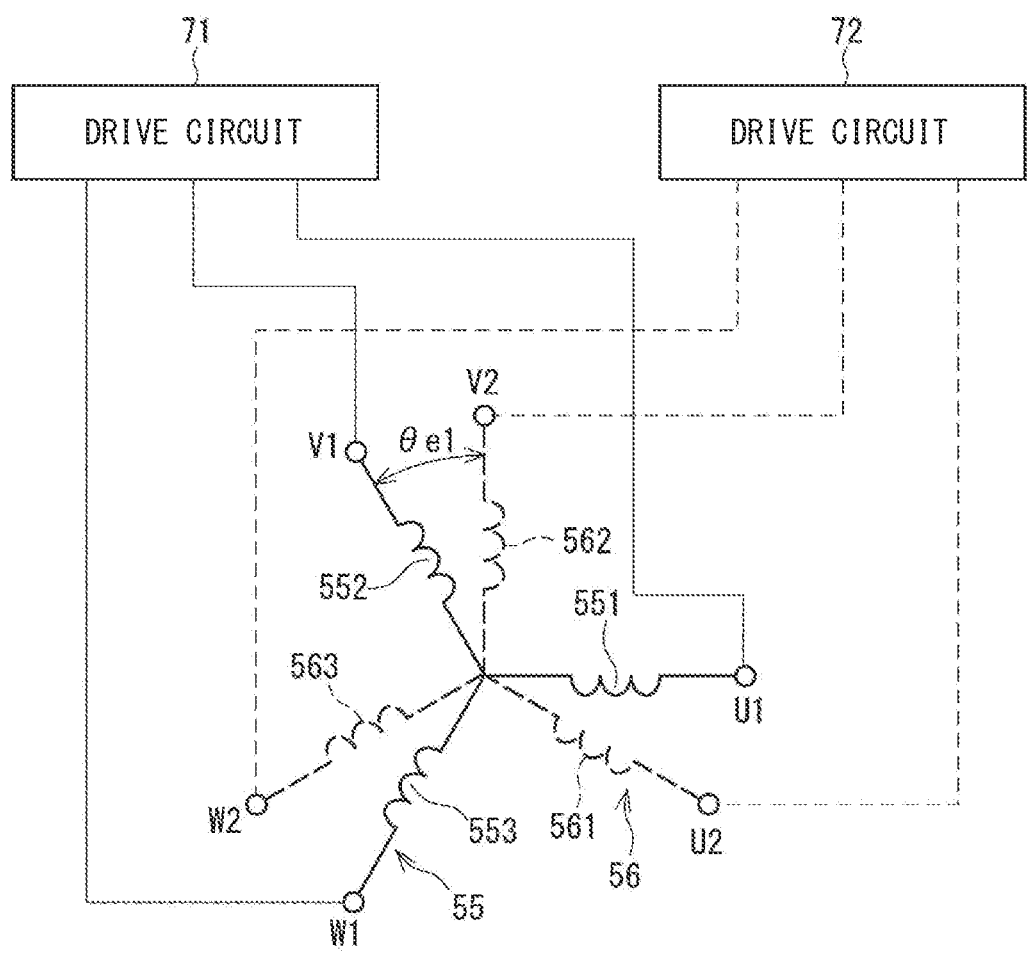
FIG. 3 is a schematic view showing an arrangement of the three-phase windings of the motor of FIG. 1.

As shown in FIG. 3, the three-phase windings 55 and 56 have the same electrical characteristics and are arranged on the common stator core 54 at the electrical angle of θe1 offset from each other. By this arrangement, the three-phase alternating current with a same amplitude and a phase between each set shifted by θe1 in the electrical angle is energized to the three-phase windings 55 and 56.

In the present embodiment, the three-phase windings 55 and 56 are energized so that the phase difference θe1 between each set is 30 [deg] in the electrical angle. The phase difference θe1 is not limited to 30 [deg] and may be 30±60×n [deg]. The above n is an integer.

As described above, when the two sets of three-phase windings 55 and 56 are energized with the same amplitude and a phase difference of 30°, the 6th harmonic currents $i_{1\_6d}$ and $i_{1\_6q}$ of the first system are respectively expressed in equations (5) and (6). Then, the relationship between the 6th harmonic currents $i_{1\_6d}$ and $i_{1\_6q}$ of the first system and the second harmonic currents $i_{2\_6d}$ and $i_{2\_6q}$ of the second system are expressed by equations (7) and (8) respectively.

$$i_{1\_6d} = I_{6d} \sin(6\theta) \quad (5)$$

$$i_{1\_6q} = I_{6q} \cos(6\theta) \quad (6)$$

$$i_{2\_6d} = I_{6d} \sin\{6(\theta+30)\} = -I_{6d} \sin(6\theta) = -i_{1\_6d} \quad (7)$$

$$i_{2\_6q} = I_{6q} \cos\{6(\theta+30)\} = -I_{6q} \cos(6\theta) = -i_{1\_6q} \quad (8)$$

Therefore, in the torque T, the term of the 6th harmonic current related to the interlinkage magnetic flux (a and the term of the product of the 6th harmonic current and the fundamental wave current related to the inductance difference ($L_d-L_q$) are canceled, and the equation (9) is derived. That is, the 6th harmonic component of the torque ripple can be canceled by energizing with a phase difference of 30°.

$$T = T1 + T2 = \Phi a(i_{1\_0q} + i_{2\_0q} + i_{1\_12q} + i_{2\_12q}) + (L_d - L_q)$$
$$(i_{1\_0di1\_0q} + i_{1\_0di1\_12q} + i_{1\_6di1\_6q} + i_{1\_12di1\_0q}) +$$
$$(L_d - L_q)(i_{2\_0di2\_0q} + i_{2\_0di2\_12q} + i_{2\_6di2\_6q} +$$
$$i_{2\_12di2\_0q}) \quad (9)$$

(Skew Structure)

As shown in FIG. 1, the stator core 54 is composed of two core portions 541 and 542 that are combined with each other in the axial direction.

Figure 4:
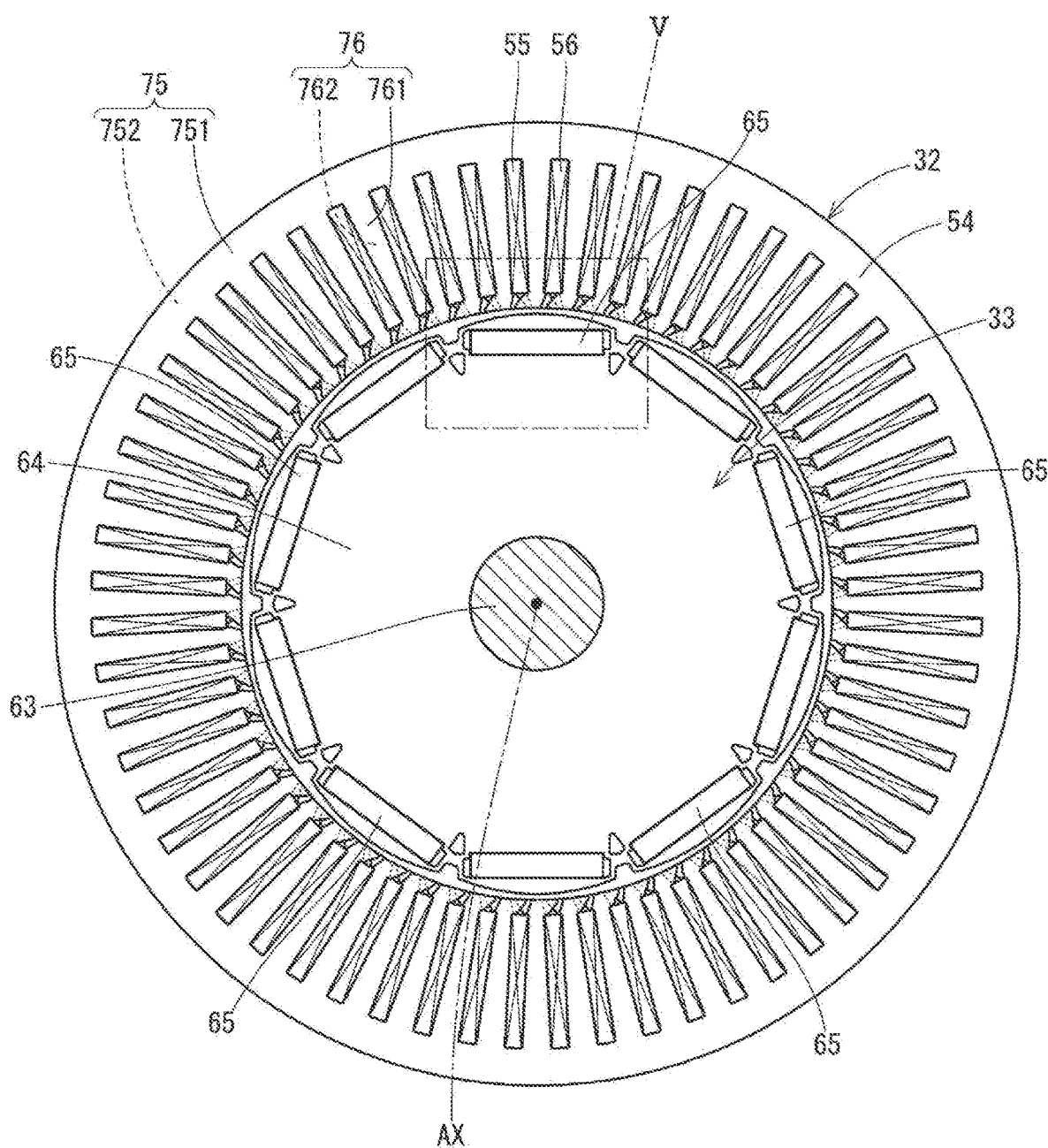
FIG. 4 is a sectional view taken along a line IV-IV of the stator and rotor of FIG. 1.
Figure 5:
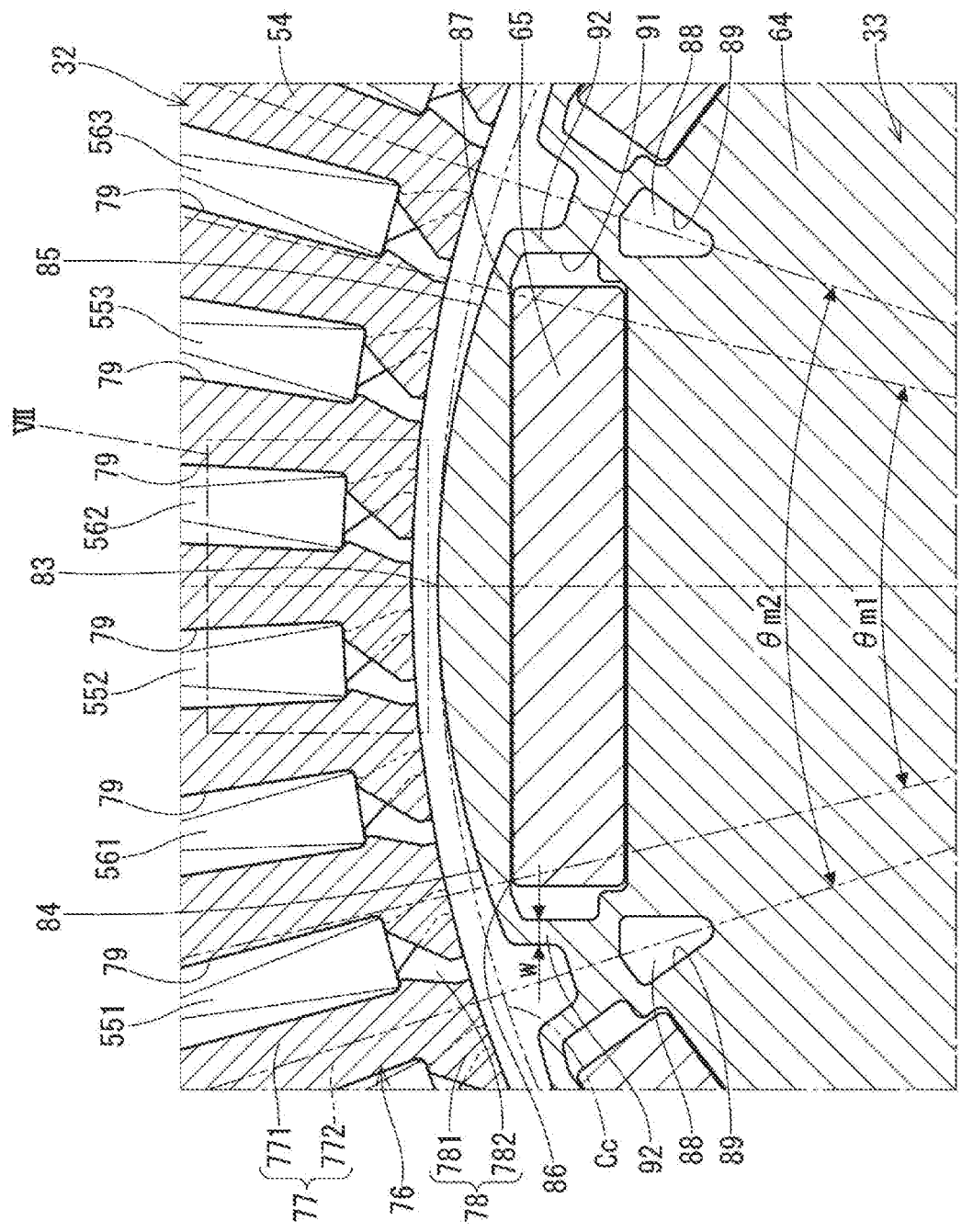
FIG. 5 is an enlarged view of a V portion of FIG. 4.

As shown in FIGS. 1, 4, and 5, the first core portion 541 has an annular back yoke portion 751 and a plurality of teeth portions 761 protruding inward in a radial direction from the back yoke portion 751. The teeth portion 761 includes a first extending part 771 extending in the radial direction and a first skew forming part 781 provided on a tip of the first extending part 771, and on the rotor 33 side with respect to the first extending part 771. In FIG. 4, hatching of the stator core 54, the rotor core 64, and the permanent magnet 65 is omitted in order to avoid complication.

Figure 6:
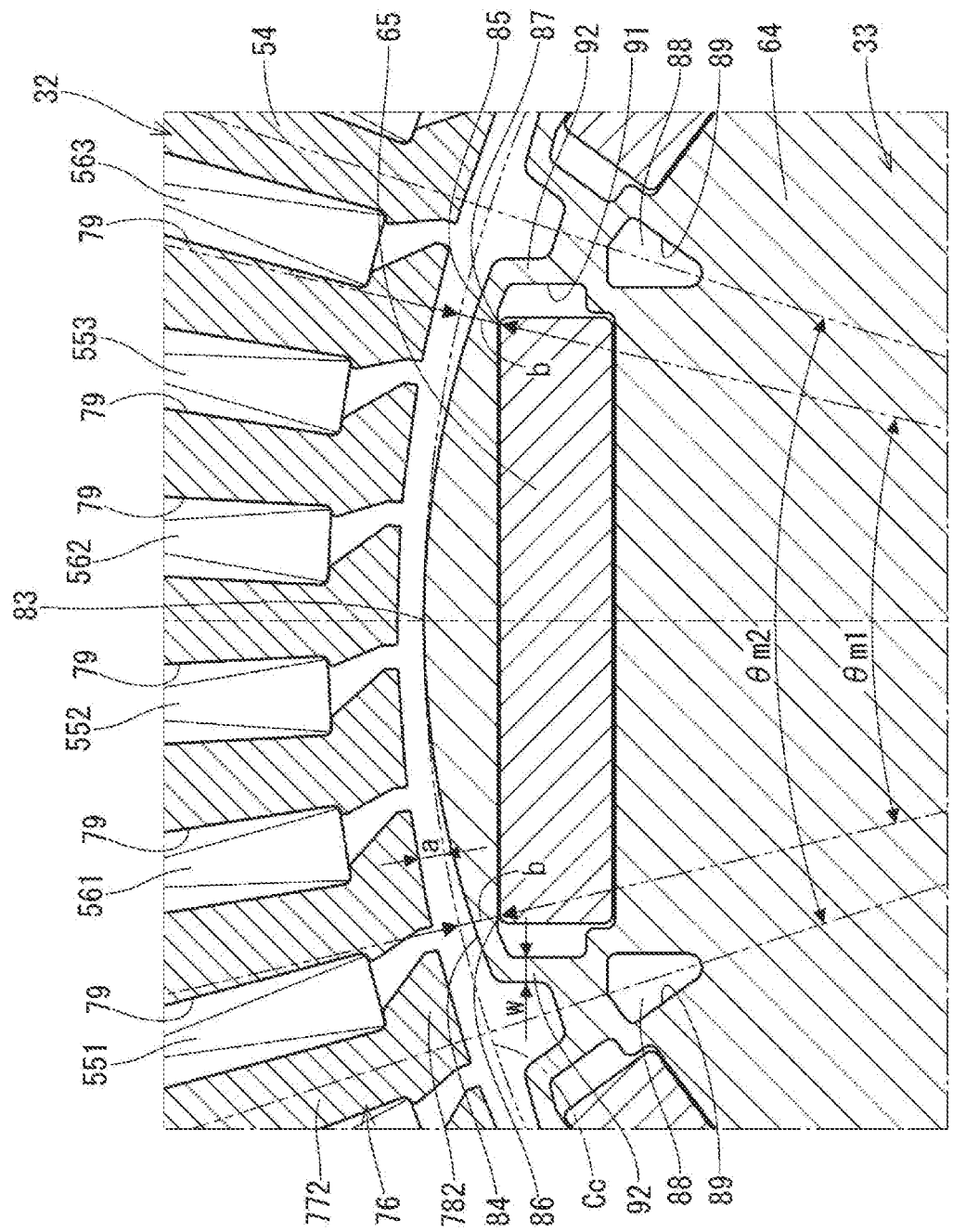
FIG. 6 is a partially enlarged and a sectional view taken along a line VI-VI of the stator and rotor of FIG. 1, which corresponds to FIG. 5.

As shown in FIGS. 1, 4, and 6, the second core portion 542 has an annular back yoke portion 752 and a plurality of teeth portions 762 protruding inward in the radial direction from the back yoke portion 752. The teeth portion 762 includes a second extending part 772 extending in the radial direction and a second skew forming part 782 provided on a tip of the second extending part 772, that on the rotor 33 side with respect to the second extending part 772.

As shown in FIG. 4, the back yoke portions 751 and 752 form the back yoke 75 of the stator core 54. The teeth portions 761 and 762 form the teeth 76 of the stator core 54.

When viewed from the axial direction, the shape of the first extending part 771 is the same as the shape of the second extending part 772. Further, a circumferential position of the first extending part 771 and a circumferential position of the second extending part 772 are the same. The first extending part 771 and the second extending part 772 form an extending portion 77 of the teeth 76. A slot 79 extending straight from one end to the other end of the stator core 54 in the axial direction is formed between the extending portions 77.

Three-phase windings 55 and 56 are provided in each slot 79. The three-phase winding 55 is composed of a U-phase winding 551, a V-phase winding 552, and a W-phase winding 553 (see FIG. 3). The three-phase winding 56 is composed of a U-phase winding 561, a V-phase winding 562, and a W-phase winding 563 (see FIG. 3). The slots 79 are formed at equal angular intervals, and the pitch thereof is the same as the phase difference θe1. The three-phase winding 55 and the three-phase winding 56 are wound around the stator core 54 so as to be offset by the angle θe1 from each other.

As shown in FIG. 5, the first skew forming part 781 and the second skew forming part 782 constitute the tip portion 78 of the teeth 76. The first skew forming part 781 is formed so as to project to one side in the circumferential direction with respect to the extending portion 77. The second skew forming part 782 is formed so as to project to the other side in the circumferential direction with respect to the extending portion 77.

Figure 7:
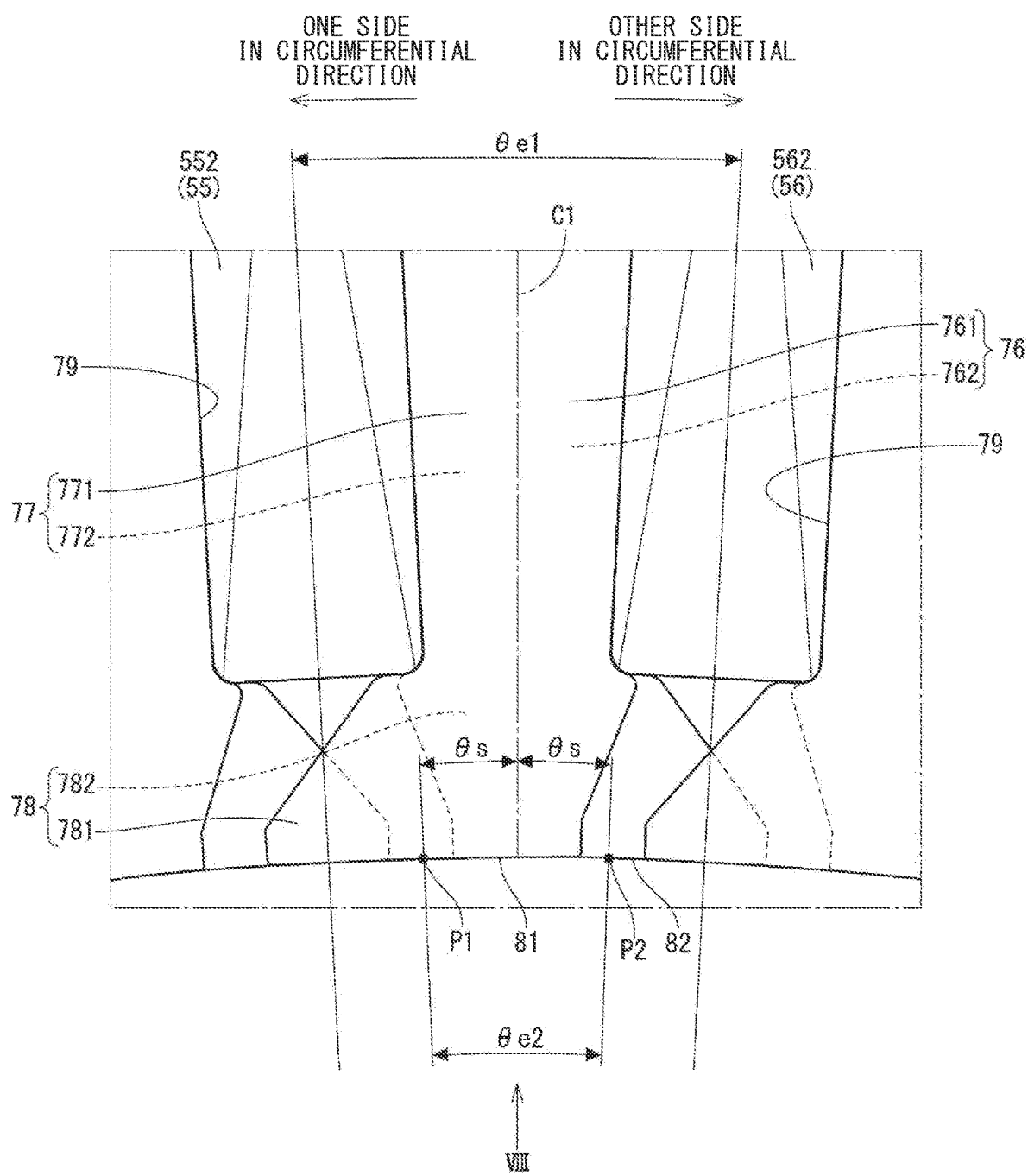
FIG. 7 is an enlarged view of a VII portion of FIG. 5.

As shown in FIG. 7, the first skew forming part 781 has a teeth tip surface 81 which is a surface facing the rotor 33 (see FIG. 5). A circumferential center position P1 of the teeth tip surface 81 is shifted by θs from a first virtual surface C1 indicating a circumferential center of the extending portion 77. A skew angle of the circumferential center position P1 with respect to the first virtual surface C1 is θs. In FIG. 7, hatching of the extending portion 77 and the tip portion 78 is omitted in order to avoid complication.

The second skew forming part 782 has a teeth tip surface 82 which is a surface facing the rotor 33 (see FIG. 5). A circumferential center position P2 of the teeth tip surface 82 is shifted by θs with respect to the first virtual surface C1. A skew angle of the circumferential center position P2 with respect to the first virtual surface C1 is θs.

Figure 8:
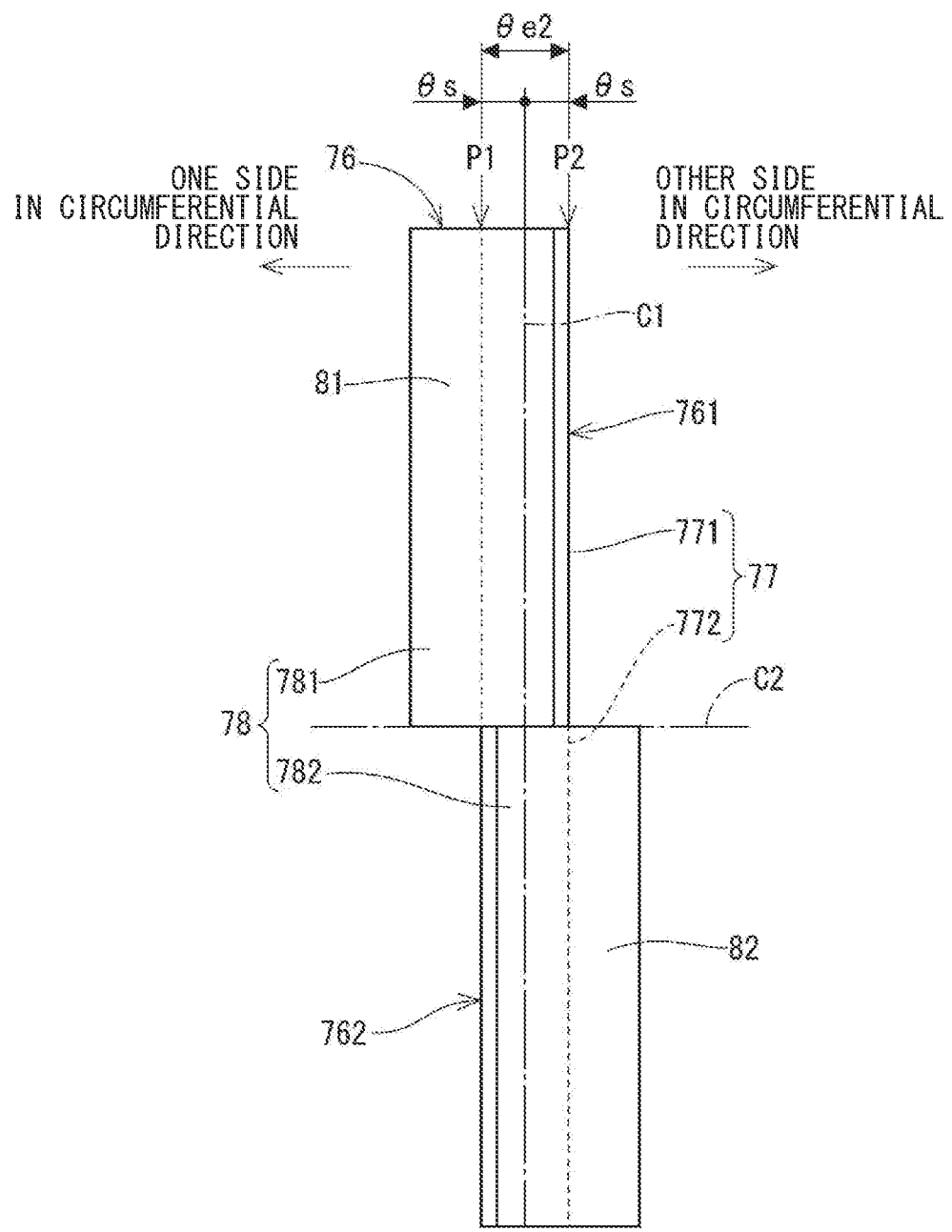
FIG. 8 is a schematic view of one teeth of FIG. 7 as viewed from the direction of arrow VIII.

As shown in FIGS. 7 and 8, the tip portion 78 has a skew structure having a plurality of skew forming parts 781 and 782 divided in the axial direction so as to be displaced by a predetermined angle θe2 in the electrical angle in the circumferential direction. That is, the first skew forming part 781 and the second skew forming part 782 are aligned in the axial direction but are displaced from each other in the circumferential direction to form a two-stage skew. As shown in FIG. 8, the skew forming parts 781 and 782 are arranged so as to have a point-symmetrical shape when viewed from the inside in the radial direction. The point of symmetry is a point where the first virtual surface C1 and the second virtual surface C2 indicating the axial center of the tip portion 78 intersect.

The circumferential center positions P1 and P2 of the teeth tip surfaces 81 and 82 are displaced by a predetermined angle θe2 in the circumferential direction in the electric angle. Then, the relationship of the following equation (10) is satisfied. In the present embodiment, θe1 has an electrical angle of 30°. Further, θe2 has an electric angle of 15°, which is twice of θs.

$$\theta e1 > \theta e2 \quad (10)$$

As described above, the stator core 54 is composed of two core portions 541 and 542, and the skew forming parts 781 and 782 at the tip of the teeth of each core portion are arranged so as to be offset by 15°. In this case, if the 12th harmonic currents $i_{1\_12d}$ and $i_{1\_12q}$ of the first system are given by equations (11) and (12), the relationship between the 12th harmonic currents $i_{1\_12d}$ and $i_{1\_12q}$ and the 12th harmonic currents $i_{2\_12d}$ and $i_{2\_12q}$ of the second system is expressed by equations (13) and (14).

$$i_{1\_12d} = I_{12d} \sin(12\theta) \tag{11}$$

$$i_{1\_12q} = I_{12q} \cos(12\theta) \tag{12}$$

$$i_{2\_12d} = I_{12d} \sin\{12(\theta+15)\} = -I_{12d}\sin(12\theta) = -i_{1\_12d} \tag{13}$$

$$i_{2\_12q} = I_{12q} \cos\{12(\theta+15)\} = -I_{12q}\cos(12\theta) = -i_{1\_12q} \tag{14}$$

Therefore, in the torque T of the equation (9), the term of the 12th harmonic current related to the interlinkage magnetic flux pa and the term of the product of the 12th harmonic current and the fundamental wave current related to the inductance difference $(L_d-L_q)$ are canceled, and the equation (15) is derived. That is, the skew structure of the offset by 15° can cancel the 12th harmonic component caused by the 12th harmonic current.

$$T = \varphi a(i_{1\_0q} + i_{2\_0q}) + (L_d - L_q)(i_{1\_0d}i_{1\_0q} + i_{1\_6d}i_{1\_6q}) + (L_d - L_q)(i_{2\_0d}i_{2\_0q} + i_{2\_6d}i_{2\_6q}) \tag{15}$$

In the equation (15), the term of the product of the 6th harmonic current on the d-axis and the 6th harmonic current on the q-axis remains even if the phase difference energization and skew structure are adopted. This term affects torque T as the 12th harmonic component of torque ripple. The 12th harmonic component caused by such a 6th harmonic current can be reduced by the following configuration.

(Air Gap and Permanent Magnet)

As shown in FIG. 6, a central portion 83 in the circumferential direction of the magnetic poles of the rotor 33 is in contact with a circumscribed circle Cc of the rotor 33. Further, both side portions 84 and 85 in the circumferential direction with respect to the central portion 83 of the magnetic poles of the rotor 33 are separated radially inward from the circumscribed circle Cc. In the present embodiment, the outer peripheral surface of the magnetic pole of the rotor 33 is a convex curved surface that is convex toward the stator 32 side. The cross-sectional shape of this convex curved surface is a shape in which one or more arcs are continuously connected.

Here, a radial distance between the stator 32 and the circumscribed circle Cc is set to a. That is, a is an air gap between the stator 32 and the rotor 33. Further, the radial distance between magnet outermost parts 86 and 87 located on the outermost side of the permanent magnets 65 in the radial direction and the circumscribed circle Cc is set to b. The rotor core 64 and the permanent magnet 65 are provided so as to satisfy the relationship of the following equation (16).

$$a/b < 1 \tag{16}$$

Figure 9:
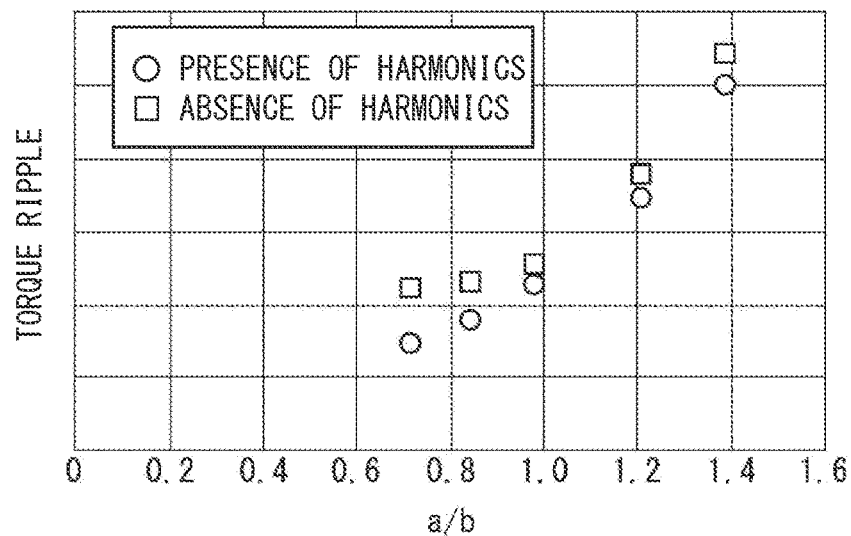
FIG. 9 is a diagram showing a relationship between a dimensional ratio of each part of the rotor and a torque ripple for each presence or absence of the 6th harmonic current.

In general, the d-axis magnetic flux (that is, the d-axis component of the magnetic flux of the rotor 33) passes through the permanent magnet 65 having a low magnetic permeability, so that the d-axis inductance $L_d$ is relatively small. Since the contribution of the magnetic resistance of the permanent magnet 65 is large, it is not easily affected by the magnetic saturation of the rotor core 64. On the other hand, since the q-axis magnetic flux (that is, the q-axis component of the magnetic flux of the rotor 33) passes through the rotor core 64, the transmittance thereof is larger than that of the d-axis magnetic flux, and the q-axis inductance $L_q$ is relatively large. Therefore, when the relationship of the equation (16) is satisfied, the q-axis magnetic flux becomes small, and the d-axis inductance $L_d$ can be brought close to the q-axis inductance $L_q$. That is, the difference between the d-axis inductance $L_d$ and the q-axis inductance $L_q$ can be reduced. As a result, the term of the inductance difference $(L_d-L_q)$ in the equation (15) becomes small, and the torque ripple can be reduced even when there is a 6th harmonic current. As shown in FIG. 9, when the relationship of the equation (16) is satisfied, it can be seen that the torque ripple is reduced regardless of the presence or absence of the 6th harmonic current.

(Magnet Opening Angle)

In the present embodiment, one magnetic pole includes one permanent magnet 65. A first magnet outermost part 86 is a part of the permanent magnet 65 located on the outermost side in the radial direction in one of the circumferential directions with respect to the central portion 83. A second magnet outermost part 87 is a part of the permanent magnet 65 located on the outermost side in the radial direction on the other side in the circumferential direction with respect to the central portion 83.

Here, a circumferential angle from first magnet outermost part 86 to second magnet outermost part 87 is set to θm1. In other words, θm1 is the magnetic d-axis opening angle (that is, the magnet opening angle) at one magnetic pole. Further, the circumferential angle of one magnetic pole is set to θm2. In other words, θm2 is a pair of q-axis angles adjacent to each other in the circumferential direction. The rotor core 64 and the permanent magnet 65 are provided so as to satisfy the relationship of the following equation (17).

$$\theta m1/\theta m2 = 0.72 \text{ to } 0.79 \tag{17}$$

Figure 10:
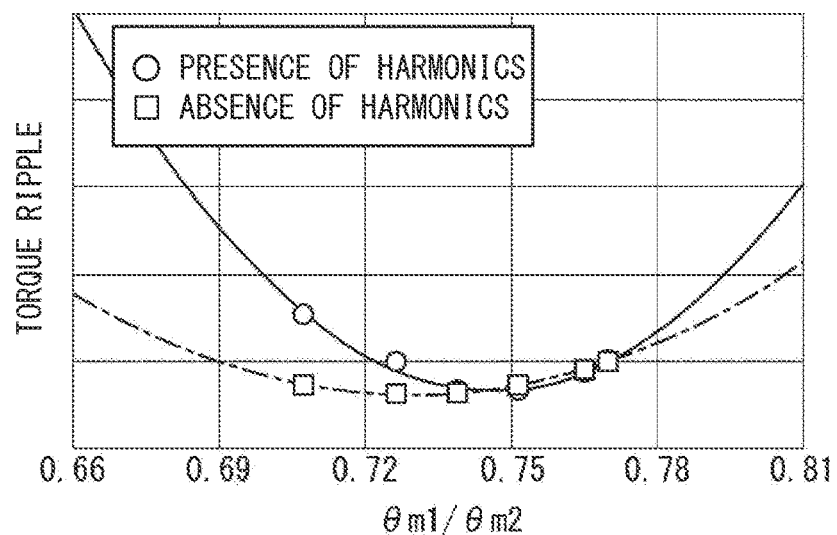
FIG. 10 is a diagram showing a relationship between a ratio of a magnet opening angle to a magnetic pole and the torque ripple for each presence or absence of the 6th harmonic current.

As shown in FIG. 10, when the relationship of the equation (17) is satisfied, it can be seen that the torque ripple is reduced regardless of the presence or absence of the 6th harmonic current.

(Permeability Lowering Portion)

A magnetic permeability lowering portion 88 for lowering the magnetic permeability is provided on the q-axis of the rotor core 64. In the present embodiment, the magnetic permeability lowering portion 88 is an air in a through hole 89 opened in the axial direction. By providing the magnetic permeability lowering portion 88 in this way, the q-axis magnetic flux is reduced, and the torque ripple can be reduced even when there is a 6th harmonic current as described above.

(Laminated Body)

In FIGS. 1 and 8, the core portions 541 and 542 are illustrated as if they were one member, in order to avoid complicating the drawings. Actually, the core portions 541 and 542 are laminated bodies in which cold rolled steel plates such as electromagnetic steel plates or SPCCs are laminated. The laminated body is formed by sequentially laminating the plates constituting these two types of core portions 541 and 542. As shown in FIGS. 7 and 8, the first skew forming part 781 and the second skew forming part 782 have a shape symmetrical with respect to the first virtual surface C1 of the extending portion 77. Therefore, if the plate constituting the first core portion 541 is turned inside out, it can be used as a plate constituting the second core portion 542. That is, the same plate can be used for the plate constituting the first core portion 541 and the plate constituting the second core portion 542.

(Bridge Portion)

As shown in FIG. 6, the permanent magnet 65 is provided in a magnet accommodating hole 91 of the rotor core 64. On both sides of the magnet accommodating hole 91 in the circumferential direction, bridge portions 92 for connecting a portion inside the radial direction and a portion outside the radial direction with respect to the permanent magnet 65 are provided. A thinnest portion of the portion surrounding the magnet accommodating hole 91 of the rotor core 64 is the bridge portion 92. Assuming that a thickness of the steel plate is t and a width of the bridge portion 92 is set to w, the relationship of the following equation (18) is satisfied.

$$w<a<2t \qquad (18)$$

By reducing the radial distance a, the magnetic resistance in the air gap is reduced. As a result, high torque can be achieved. Further, by reducing the width w of the bridge portion 92, the magnetic resistance of the path of the short circuit magnetic flux is increased. As a result, the short circuit of the magnetic flux passing through the bridge portion 92 is reduced, more magnetic flux is interlinked with the stator 32, and high torque can be achieved.

(Axial Length of Skew Forming Part)

As shown in FIG. 1, the difference in the number of laminated sheets of the skew forming parts 781 and 782 is 2 or less. In the present embodiment, a ratio of the axial lengths of the skew forming parts 781 and 782 is "50:50". That is, the axial length La of the first skew forming part 781 is the same as the axial length Lb of the second skew forming part 782. Further, assuming that the sum of the axial lengths of the skew forming parts 781 and 782 is set to Ls (=La+Lb) and the axial length of the rotor core 64 is set to Lr, the relationship of the following equation (19) is satisfied. Further, assuming that the axial length of the permanent magnet 65 is set to Lmg, the relationship of the following equation (20) is satisfied.

$$Ls<Lr \qquad (19)$$

$$Ls<Lmg \qquad (20)$$

Generally, the rotor core 64 has an assembly error in the axial direction. In the motor 23 having the stator 32 having a skew structure as in the present embodiment, the torque ripple canceling effect is biased due to the assembly error, which causes a problem as a result. On the other hand, by satisfying the relations of the equations (19) and (20), the areas of the skew forming parts 781 and 782 facing the rotor 33 can be made equal even if an assembly error occurs. Therefore, the torque ripple canceling effect can be maintained.

(Effects)

As described above, in the present embodiment, the three-phase windings 55 and 56 are energized so that the phase difference θe1 between each set is 30±60×n [deg] in the electrical angle. The tip portion 78 of the teeth 76 has a skew structure having a plurality of skew forming parts 781 and 782 divided in the axial direction so as to be displaced by a predetermined angle θe2 in the circumferential direction. Further, the relationship between the above equations (10) and (16) is satisfied.

By satisfying the relational expression a/b<1 as in the equation (16), the q-axis component of the magnetic flux of the rotor 33 becomes small. In addition, the induced voltage distortion generated by the rotor 33 is reduced. As a result, the influence of the reluctance torque is small even when there is a 6th harmonic current, so that it is possible to suppress the generation of the 12th harmonic component that could not be canceled by the phase difference energization and the skew structure. Further, the structure of the motor 23 makes it possible to reduce the 12th harmonic component, and it does not depend on the control device. Therefore, according to the motor 23, it is possible to reduce the torque ripple without requiring higher performance of the control device.

Further, in the present embodiment, the relationship of the above formula (17) is satisfied. As a result, torque ripple can be reduced regardless of the presence or absence of the 6th harmonic current.

Further, in the present embodiment, the relationship of the above formula (18) is satisfied. By reducing the radial distance a, the magnetic resistance in the air gap is reduced. As a result, high torque can be achieved. Further, by reducing the width w of the bridge portion 92, the magnetic resistance of the path of the short circuit magnetic flux is increased. As a result, the short circuit of the magnetic flux passing through the bridge portion 92 is reduced, more magnetic flux is interlinked with the stator 32, and high torque can be achieved.

In the present embodiment, the difference in the number of laminated sheets of the skew forming parts 781 and 782 is 2 or less. Further, the relationship of the above formula (19) is satisfied. As a result, even if the assembly error occurs, the areas of the skew forming parts 781 and 782 facing the rotor 33 can be made equal to each other. Therefore, the torque ripple canceling effect can be maintained.

Further, in the present embodiment, a magnetic permeability lowering portion 88 for lowering the magnetic permeability is provided on the q-axis of the rotor core 64. By providing the magnetic permeability lowering portion 88 in this way, the q-axis magnetic flux is reduced, and the torque ripple can be reduced even when there is a 6th harmonic current as described above.

Other Embodiments

In the above described embodiment, there are three features (A), (B), and (C). The feature (A) is that the phase difference θe1 between each set of the plurality of sets of multi-phase windings is 30±60×n [deg] in the electrical angle. The feature (B) is that the tip portion of the teeth has the skew structure in which a predetermined angle θe2 is shifted in the electrical angle, and θe1 is larger than θe2 (θe1>θe2). The feature (C) is that a/b is smaller than 1 (a/b<1). On the other hand, in another embodiment, it may be a rotating electric machine having the features (A) and (C) or a rotating electric machine having the features (B) and (C).

In other embodiments, one magnetic pole of the rotor core may include two or more permanent magnets. Further, in another embodiment, the outer peripheral surface of the magnetic pole of the rotor core may be composed of a combination of a curved surface and a flat surface. Further, in another embodiment, the magnetic permeability lowering portion is not limited to the air in the through hole, for example, a non-magnetic member such as a resin in the through hole, or a magnetic member whose quality is altered by a laser or the like.

In other embodiments, the motor is not limited to electric power steering systems and may be applied other systems and devices. Further, in another embodiment, the rotating electric machine is not limited to the motor, and may be used for a generator or a motor generator.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

What is claimed is:

1. A rotating electric machine comprising:
a stator including a stator core having a plurality of teeth extending in a radial direction, and a plurality of sets of multi-phase windings provided between the teeth, and
a rotor including a rotor core provided to face the teeth and a plurality of permanent magnets provided to be embedded in the rotor core,
wherein
the stator core is composed of a plurality of core portions that are combined with each other in an axial direction,
the core portion includes a teeth portion that constitutes the teeth,
the teeth portion has an extending part extending in a radial direction and a skew forming part provided on the rotor side with respect to the extending part,
circumferential positions of the plurality of extending parts are the same, and a slot extending straight from one end to the other end in the axial direction of the stator core is formed between the plurality of extending parts,
a tip portion of the teeth has a skew structure having a plurality of skew forming parts divided in the axial direction so as to be displaced by a predetermined angle in the circumferential direction in an electrical angle,
an outer peripheral surface of a magnetic pole of the rotor is formed so as to be convex toward the stator side,
a central portion in a circumferential direction of the magnetic poles of the rotor is in contact with a circumscribed circle of the rotor, and both side portions of the magnetic poles of the rotor in the circumferential direction with respect to the central portion are radially inward from the circumscribed circle,
the permanent magnet is formed so as to have a rectangular shape in a cross section orthogonal to the rotation center of the rotor, and is arranged so that a lateral direction coincides with the radial direction,
the permanent magnet has a first magnet outermost part, which is an outermost part in the radial direction on one side of the circumferential direction with respect to the central portion, and a second magnet outermost part, which is an outermost part in the radial direction on the other side of the circumferential direction with respect to the central portion,
a relational expression a/b<1 is satisfied, when a radial distance between the teeth and the circumscribing circle is set to a, and a radial distance between the first magnet outermost part and the second magnet outermost part located on the outermost side of the permanent magnet in the radial direction and the circumscribing circle is set to b,
the permanent magnet is provided in a magnet accommodating hole of the rotor core,
bridge portions configured to connect a portion inside the radial direction and a portion outside the radial direction with respect to the permanent magnet are provided on both sides of the magnet accommodating hole in the circumferential direction, and
the bridge portions are a thinnest portion of the portion surrounding the magnet accommodating hole of the rotor core.

2. A rotating electric machine comprising:
a stator including a stator core having a plurality of teeth extending in a radial direction, and a plurality of sets of multi-phase windings provided between the teeth, and
a rotor including a rotor core provided to face the teeth and a plurality of permanent magnets provided to be embedded in the rotor core,
wherein
the plurality of sets of multi-phase windings are energized so that a phase difference bel between the sets is 30±60×n [deg] in an electrical angle, when n is an integer,
the stator core is composed of a plurality of core portions that are combined with each other in an axial direction,
the core portion includes a teeth portion that constitutes the teeth,
the teeth portion has an extending part extending in a radial direction and a skew forming part provided on the rotor side with respect to the extending part,
circumferential positions of the plurality of extending parts are the same, and a slot extending straight from one end to the other end in the axial direction of the stator core is formed between the plurality of extending parts,
a tip portion of the teeth has a skew structure having a plurality of skew forming parts divided in the axial direction so as to be displaced by a predetermined angle θe2 in the circumferential direction in an electrical angle,
a relational expression θe1>θe2 is satisfied,
an outer peripheral surface of a magnetic pole of the rotor is formed so as to be convex toward the stator side,
a central portion in a circumferential direction of the magnetic poles of the rotor is in contact with a circumscribed circle of the rotor, and both side portions of the magnetic poles of the rotor in the circumferential direction with respect to the central portion are radially inward from the circumscribed circle,
the permanent magnet is formed so as to have a rectangular shape in a cross section orthogonal to the rotation center of the rotor, and is arranged so that a lateral direction coincides with the radial direction,
the permanent magnet has a first magnet outermost part, which is an outermost part in the radial direction on one side of the circumferential direction with respect to the central portion, and a second magnet outermost part, which is an outermost part in the radial direction on the other side of the circumferential direction with respect to the central portion,
a relational expression a/b<1 is satisfied, when a radial distance between the teeth and the circumscribing circle is set to a, and a radial distance between the first magnet outermost part and the second magnet outermost part located on the outermost side of the permanent magnet in the radial direction and the circumscribing circle is set to b,
the permanent magnet is provided in a magnet accommodating hole of the rotor core,
bridge portions configured to connect a portion inside the radial direction and a portion outside the radial direction with respect to the permanent magnet are provided on both sides of the magnet accommodating hole in the circumferential direction, and
the bridge portions are a thinnest portion of the portion surrounding the magnet accommodating hole of the rotor core.

3. The rotating electric machine according to claim 1, wherein a relational expression Ls<Lr is satisfied, when a sum of the axial lengths of the plurality of skew forming parts is set to Ls, and an axial length of the rotor core is set to Lr, and a difference in the number of laminated sheets of the plurality of the skew forming parts is 2 or less.

4. The rotating electric machine according to claim 1, wherein the one or more permanent magnets provided in one magnetic pole of the rotor have a first magnet outermost part, which is an outermost part in the radial direction on one side of the circumferential direction with respect to the central portion of the magnetic pole, and a second magnet outermost part, which is an outermost part in the radial direction on the other side of the circumferential direction with respect to the central portion of the magnetic pole, and a relational expression θm1/θm2=0.72 to 0.79 is satisfied, when a circumferential angle from the first magnet outermost part to the second magnet outermost part is set to θm1, and the circumferential angle of one magnetic pole is set to θm2.

5. The rotating electric machine according to claim 1, wherein the rotor core is a laminated body of a plurality of steel plates, and a relational expression w<a<2t is satisfied, when a thickness of the steel plate is set to t, and a width of the bridge portion is set to w.

6. The rotating electric machine according to claim 1, wherein a magnetic permeability lowering portion for lowering the magnetic permeability is provided on the q-axis of the rotor core.

7. The rotating electric machine according to claim 2, wherein the one or more permanent magnets provided in one magnetic pole of the rotor have a first magnet outermost part, which is an outermost part in the radial direction on one side of the circumferential direction with respect to the central portion of the magnetic pole, and a second magnet outermost part, which is an outermost part in the radial direction on the other side of the circumferential direction with respect to the central portion of the magnetic pole, and a relational expression θm1/θm2=0.72 to 0.79 is satisfied, when a circumferential angle from the first magnet outermost part to the second magnet outermost part is set to θm1, and the circumferential angle of one magnetic pole is set to θm2.

8. The rotating electric machine according to claim 2, wherein the rotor core is a laminated body of a plurality of steel plates, and a relational expression w<a<2t is satisfied, when a thickness of the steel plate is set to t, and a width of the bridge portion is set to w.

9. The rotating electric machine according to claim 2, wherein a relational expression Ls<Lr is satisfied, when a sum of the axial lengths of the plurality of skew forming parts is set to Ls, and an axial length of the rotor core is set to Lr, and a difference in the number of laminated sheets of the plurality of the skew forming parts is 2 or less.

10. The rotating electric machine according to claim 2, wherein a magnetic permeability lowering portion for lowering the magnetic permeability is provided on the q-axis of the rotor core.

* * * * *